M. SITNEY.
RECIPROCATING GEARING.
APPLICATION FILED JULY 31, 1915.
1,210,861.
Patented Jan. 2, 1917.
2 SHEETS—SHEET 1.
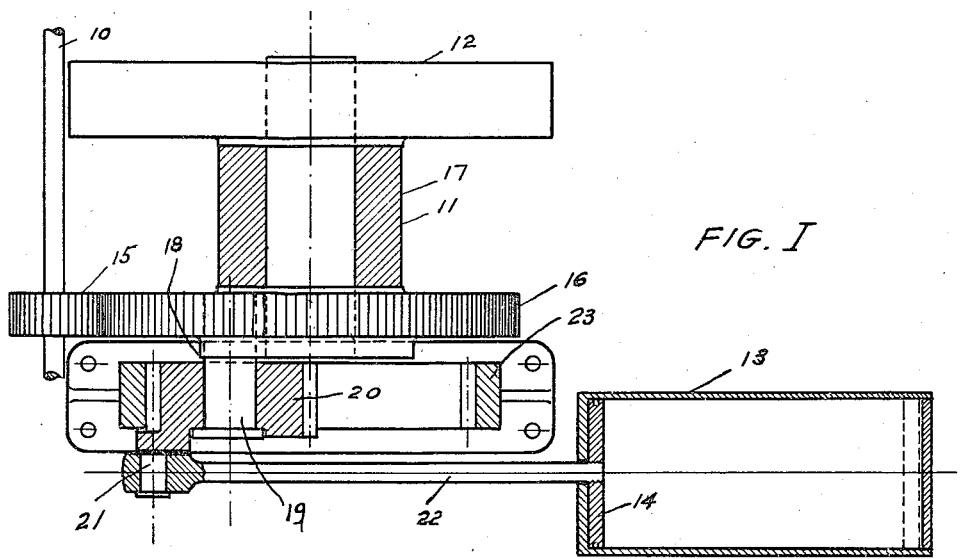
FIG. I
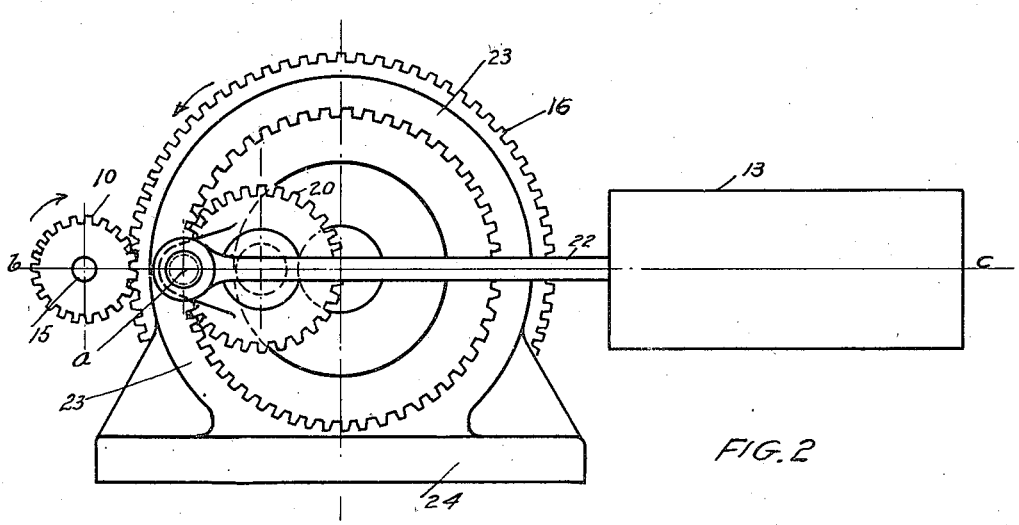
FIG. 2
INVENTOR
Massey Sitney
BY
ATTORNEY

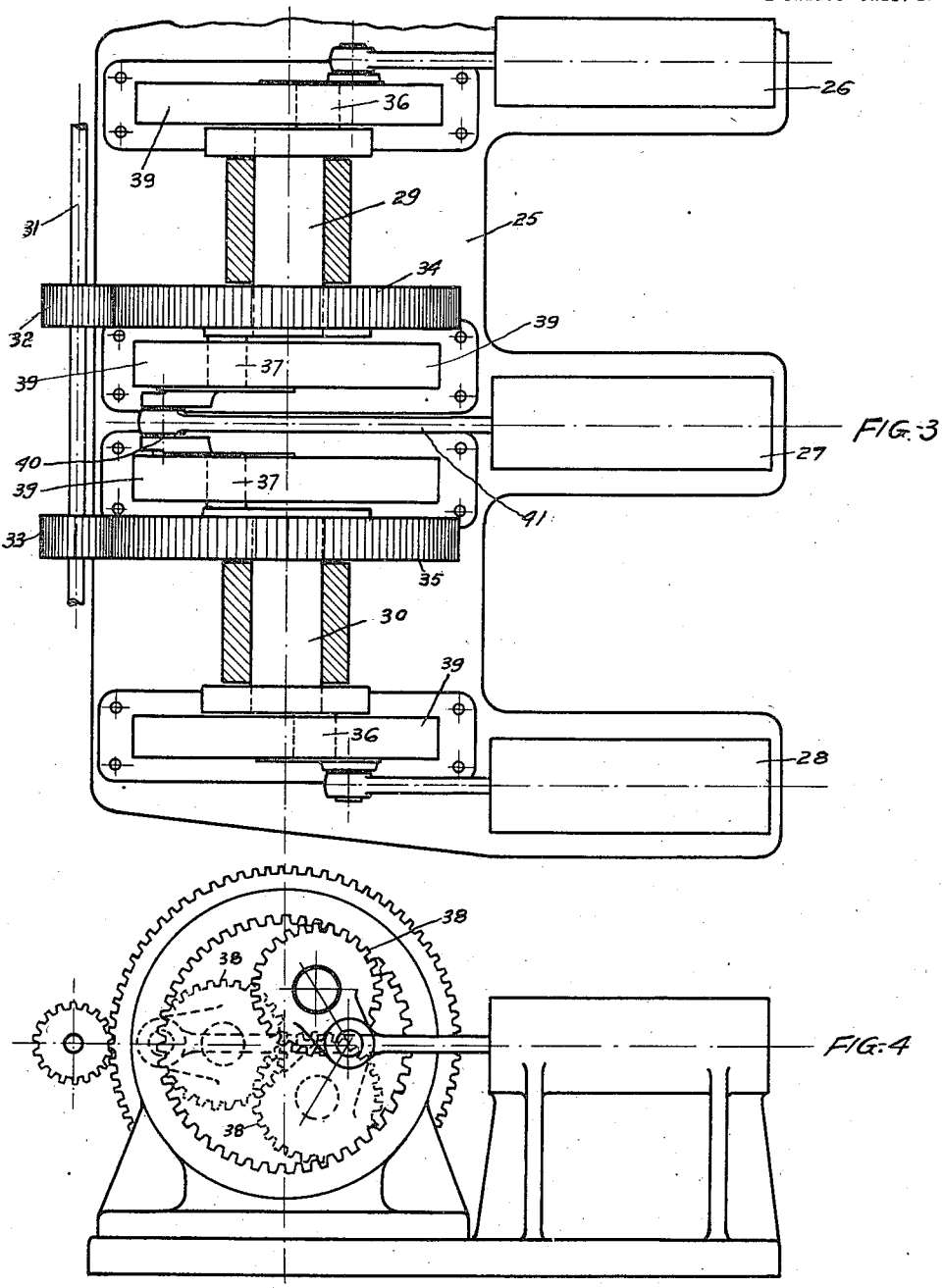

UNITED STATES PATENT OFFICE.

MASSEY SITNEY, OF SOUTH BETHLEHEM, PENNSYLVANIA.

RECIPROCATING GEARING.

1,210,861.

Specification of Letters Patent.  Patented Jan. 2, 1917.

Application filed July 31, 1915. Serial No. 42,920.

*To all whom it may concern:*

Be it known that I, MASSEY SITNEY, a citizen of the United States of America, and a resident of the city of South Bethlehem, in the county of Northampton and State of Pennsylvania, have invented certain new and useful Improvements in Reciprocating Gearing, of which the following is a specification, reference being had to the accompanying drawings, forming a part thereof.

My invention relates to mechanical movement or gearing and particularly to such as are adapted to transmit power from a rotary to a reciprocatory member or vice versa.

The object of my invention is to provide a relatively simple and durable gearing for the aforesaid purpose that shall make a very compact arrangement of crank shaft and cylinder possible.

When a rotary driving shaft is connected to the piston of a plunger pump, or any other member to be reciprocated by means of a connecting rod and crosshead in accordance with the usual practice, the space between the cylinder and crank pin is necessarily long. With the gearing of my invention the entire space occupied by the driving and driven apparatus and the gearing is materially reduced on account of the elimination of the crosshead and connecting rod.

Other objects and advantages of my invention will be set forth hereinafter and in order that my invention may be fully understood I will describe the same with reference to the accompanying drawings and set forth the novel feature thereof in appended claims.

Referring to the drawings: Figure 1 is a partially sectional plan view of apparatus which embodies the mechanical movement or gearing of my invention. An end elevation of the same mechanism is shown in Fig. 2. Figs. 3 and 4 correspond respectively to Figs. 1 and 2 and show a modified apparatus which also embodies my invention.

The structure of Figs. 1 and 2 comprises a driving shaft 10, a crank shaft 11 having a fly wheel 12, a cylinder 13, a piston 14 therein, and the gearing of my invention, which is interposed between the crank shaft and the piston. The cylinder 13 and piston 14 are intended to represent a pump or some other similar device, the piston of which is reciprocated by an electric or other driving motor (not shown) which produces a rotation movement of the shaft 10. A pinion 15 is mounted on the shaft 10 and meshes with a gear wheel 16 on the crank shaft 11. The crank shaft is rotatively mounted in a bearing 17 and the gear wheel 16 coöperates with the fly wheel 12 in keeping the rotative movement of the crank shaft substantially uniform. Extending in an axial direction from the hub 18 of the gear wheel 16 is a crank pin 19 on which is rotatively mounted a pinion 20. Extending outwardly in an axial direction from this pinion and with its center line coincident with the sectional pitch line of the pinion, as shown in Fig. 1, is a second crank pin 21. This pin is connected to the piston 14 by a rod 22, which, as hereinafter explained, has a simple straight line movement in the center line of the cylinder. The pinion 20 meshes with a stationary internal gear 23, which is provided with a base 24 and may be integral with the stationary bearing 17 of the crank shaft and the cylinder 13. The pitch diameter of the pinion 20 is equal to one-half of the pitch diameter of the stationary gear 23. The point $a$ in the pitch diameter of the pinion, which is shown in contact with the pitch diameter of the stationary gear, moves when the pinion is rotated, in a straight line $b.$ $c.$ which extends through the center of the gear 23.

In operation, assuming that the shaft 10 and the pinion 15 are driven in a clock-wise direction, as indicated by the arrow in Fig. 2, the gear wheel 16 will be driven in a counter clock-wise direction. This gear is secured to the crank shaft 11, as already explained and consequently the crank pin 19, the crank shaft itself and the fly wheel 12 rotate together in response to the movement imparted to the gear-wheel by the pinion. The crank pin 21 of the pinion 20 corresponds in its movement to any single peripheral point of the pinion. Since the internal gear 23 is stationary and the center of the pinion 20, *i. e.* the crank pin 19, moves in a circle which is concentric with the internal gear 23, the pinion will obviously revolve about the axis of the crank shaft as a center and will rotate upon the crank pin 19 as an axis. The result of these movements is that the crank pin 21 and the connecting rod 22 travel in a straight line, the arrangement of parts being such that this straight line is coincident with the center line of the cylinder 13. The point *a* moves in the direction *b c* when the pinion 20 rotates in the lower half of gear 23 and reverses, moving in the direction *c b* in the upper half of gear 23. Thus the piston 14 is reciprocated in the cylinder and has a simple straight line motion.

The structure of Figs. 3 and 4 corresponds to that of Figs. 1 and 2 and operates on the same principle. The arrangement of parts, however, is a device where a single motor or a single shaft is utilized for driving a plurality of pumps, compressor or the like. Having special reference to these figures; 25 represents a base or bed-plate of the structure; 26, 27 and 28, three stationary cylinders; 29 and 30, a pair of co-axial crank shafts; 31 a driving shaft; 32 and 33, pinions thereon; and 34 and 35 gear wheels on the respective crank shafts. Each of the crank shafts has a pair of crank pins 36 and 37, which correspond to the pin 19 of Figs. 1 and 2. Pinions 38 corresponding to the pinion 20 are mounted on these pins and mesh with internal gears 39. The pinions of the center or adjacent gears are interconnected, as shown in Fig. 3 by a single wrist pin 40, which is connected by a piston rod 41 to a piston in cylinder 27. The other two pinions are similarly connected to the pistons in the respective cylinders 26 and 28. The arrangement of parts is such that the pistons are spaced apart in their operation and consequently dead points are avoided and fly wheels are rendered unnecessary, although of course, they may be used, if desired.

My invention is adapted for various purposes and I intend that only such limitations be imposed as are indicated in the appended claims.

What I claim is:

1. A reciprocating gearing comprising a rotary driving shaft, a pair of pinions thereon, a pair of crank shaft sections parallel to the driving shaft having gears meshed with the pinions thereon, crank pin projections from the crank shaft sections at the respective ends of each, pinions rotatively mounted on the crank pin projections, stationary internal gears concentric with the crank shaft, and meshing with the several pinions, crank pin projections from the non-adjacent pinions, and a wrist pin connecting the adjacent pinions in their pitch lines, the crank pin projections from the pinions and the wrist pin being respectively adapted to be connected to operate a reciprocating member and the pinions having pitch diameters equal to one-half of the pitch diameters of the stationary gears.

2. A reciprocating gearing comprising a pair of crank shaft sections in axial alinement, means for driving the shaft sections, crank pin projections from the crank shaft sections at the respective ends of each, pinions rotatively mounted on the crank pin projections, stationary internal gears concentric with the crank shaft, and meshing with the several pinions, crank pin projections from the non-adjacent pinions, and a wrist pin connecting the adjacent pinions in their pitch lines, the crank pin projections from the pinions and the wrist pin being respectively adapted to be connected to operate a reciprocating member and the pinions having pitch diameters equal to one-half the pitch diameters of the stationary gears.

In testimony whereof, I have hereunto set my hand this 29th day of July 1915.

MASSEY SITNEY.